(12) United States Patent
Kusakabe et al.

(10) Patent No.: US 8,143,998 B2
(45) Date of Patent: Mar. 27, 2012

(54) NONCONTACT IC CARD COMMUNICATION SYSTEM AND COMMUNICATION METHOD

(75) Inventors: Susumu Kusakabe, Tokyo (JP); Minoru Handa, Kanagawa (JP)

(73) Assignee: Sony Corporation, Tokyo (JP)

( * ) Notice: Subject to any disclaimer, the term of this patent is extended or adjusted under 35 U.S.C. 154(b) by 627 days.

(21) Appl. No.: 10/545,089

(22) PCT Filed: Feb. 24, 2004

(86) PCT No.: PCT/JP2004/002131
§ 371 (c)(1),
(2), (4) Date: Aug. 9, 2005

(87) PCT Pub. No.: WO2004/077344
PCT Pub. Date: Sep. 10, 2004

(65) Prior Publication Data
US 2006/0145818 A1 Jul. 6, 2006

(30) Foreign Application Priority Data

Feb. 26, 2003 (JP) ................................ 2003-050113

(51) Int. Cl.
*H04Q 5/22* (2006.01)
(52) U.S. Cl. .................................... 340/10.4; 340/572.4
(58) Field of Classification Search ................... 340/10.4
See application file for complete search history.

(56) References Cited

U.S. PATENT DOCUMENTS

| 5,307,413 | A  | * | 4/1994 | Denzer ........................ 713/151 |
| 6,189,782 | B1 | * | 2/2001 | Takami et al. ................ 235/375 |
| 6,237,849 | B1 | * | 5/2001 | Cooper et al. ................ 235/380 |
| 7,003,316 | B1 | * | 2/2006 | Elias et al. .................. 455/556.1 |
| 7,009,517 | B2 | * | 3/2006 | Wood ......................... 340/572.1 |
| 7,075,412 | B1 | * | 7/2006 | Reynolds et al. ............. 340/10.2 |
| 7,227,449 | B2 | * | 6/2007 | Bonneau et al. ............. 340/10.41 |
| 2002/0199208 | A1 | * | 12/2002 | Chang et al. .................. 725/131 |
| 2003/0091099 | A1 | * | 5/2003 | Izumi ............................ 375/138 |
| 2005/0165695 | A1 | * | 7/2005 | Berardi et al. .................. 705/64 |

FOREIGN PATENT DOCUMENTS

DE 196 35 311 3/1998
(Continued)

OTHER PUBLICATIONS

Office Action issued Aug. 9, 2010, in Japanese Patent Application No. 2003-050113.

*Primary Examiner* — Brian Zimmerman
*Assistant Examiner* — Omer S Khan
(74) *Attorney, Agent, or Firm* — Oblon, Spivak, McClelland, Maier & Neustadt, L.L.P.

(57) ABSTRACT

Communication processing is performed so as to correspond to multiple types of contactless IC cards having different specifications, such as command classes and security algorithms. Without performing a process for a command or response result communicated with an IC card, a reading device encapsulates the command or result into a command that is called a through command and that is independent of the type of IC card and delegates the process to a controller module. Thus, the reading device is independent of the type of IC card. A command and a process procedure which depend on the type of IC card are taken care of by a replaceable software module that is provided in the controller module and that corresponds to the card.

14 Claims, 10 Drawing Sheets

FOREIGN PATENT DOCUMENTS

| | | |
|---|---|---|
| DE | 197 14 068 | 10/1998 |
| JP | 2-130670 | 5/1990 |
| JP | 11-68713 | 3/1999 |
| JP | 11-514464 | 12/1999 |
| JP | 2001-143023 | 5/2001 |
| JP | 2001-223763 | 8/2001 |
| JP | 2001-283162 | 10/2001 |
| JP | 2003-502888 | 1/2003 |
| JP | 2003-36425 | 2/2003 |
| WO | 96/36051 | 11/1996 |
| WO | 97/05582 | 2/1997 |
| WO | WO 98/52168 | 11/1998 |
| WO | 00/77717 | 12/2000 |
| WO | 01/50407 | 7/2001 |

* cited by examiner

TICKET GATE SYSTEM 1

NONCONTACT IC CARD COMMUNICATION SYSTEM AND COMMUNICATION METHOD

TECHNICAL FIELD

The present invention relates to contactless communication systems for performing transmission between a primary coil and a secondary coil by utilizing an electromagnetic induction effect. In particular, the present invention relates to a contactless-IC-card communication system and a communication method in which an IC card having a secondary coil transmits a response signal as a result of load variation in response to an electromagnetic-based query signal transmitted from a card reading device having a primary coil.

More specifically, the present invention relates to a contactless-IC-card communication system and a communication method in which a card reading device performs communication processing with a contactless IC card by using a predetermined command class and a security algorithm through a predetermined card-detection procedure. In particular, the present invention relates to a contactless-IC-card communication system and a communication method for performing communication processing for multiple types of contactless IC cards having different specifications, such as command classes and security algorithms.

BACKGROUND ART

One example of wireless communication means that are locally applicable is a contactless IC card.

This type of wireless communication is commonly achieved based on an electromagnetic induction principle. That is, the configuration includes, at least, an IC card having a memory function and a card reader/writer that performs read/write access on the memory of the IC card. An IC-card-side loop coil, which serves as a primary coil, and a card-reader/write-side antenna, which serves as a secondary coil, form one transformer as a unit. The card reader/writer transmits power and information to the IC card by similarly using an electromagnetic induction effect and the IC card is actuated by the supplied power to thereby be able to respond to a query signal from the card reader/writer.

The card reader/writer modulates current to be supplied to the antenna to thereby cause a loop-coil induced voltage on the IC card to be modulated. Due to the effect, the card reader/writer can transmit data to the IC card. Also, a variation in load between loop-coil terminals of the IC card causes an impedance between antenna terminals of the IC card reader/writer to change, so that a voltage and current passing through the antenna fluctuate. Due to the effect, the IC card returns a response to the card reader/writer.

A contactless proximity communication system, typified by an IC card, is beginning to become widespread because of simplicity in operation. For example, with an IC card on which personal identification code, other personal authentication information, and value information of an electronic ticket or the like are stored, a card reader/writer installed at a cash dispenser, an entrance of a concert venue, or a ticket gate of a station can perform authentication processing by performing contactless access to the IC card held by the user.

FIG. 9 schematically depicts the configuration of a ticket-gate system 1 that is implemented using contactless communication. A user carries a contactless IC card 2 even when he or she is in transit. A ticket gate machine 4 is installed at a ticket gate of a station, and uses an opening/closing operation of a passage gate 8 to control whether or not to permit the passage of the user in accordance with whether or not a billing process is finished or whether or not other authorization is given. A card reading/writing device 6 is installed on the ticket gate machine 4 for use. When the user attempts to pass through the ticket gate, the card reading/writing device 6 accesses the IC card 2 in the possession of the user to read/write data.

The card reading/writing device 6 constantly transmits a polling command to IC cards. When the user approaches the ticket gate machine 4 while carrying the IC card 2, the card reading/writing device 6 installed on the ticket gate machine 4 detects the approaching of the IC card 2 (i.e., detects the card) and performs communication (collision avoidance and card determination) with the IC card 2. When the passage is permitted after the billing process and mutual authentication process are performed on the user, the passage gate 8 is opened to permit the user to pass through the ticket gate.

Recently, IC cards having memory spaces with relatively large capacities have emerged in conjunction with improvements in micro-fabrication technology. Since an IC card having a large-capacity memory can store multiple applications (or services) at the same time, one IC card can be used for multiple applications. For example, when many services, such as electronic money for electronic payment, an electronic ticket for entry into a specific concert venue, are stored on one IC card, the IC card can be applied to various applications.

Further, when an individual device is equipped with both functions of the IC card and the card reader/writer, the IC card technology can be utilized for a versatile bidirectional proximity communication interface. For example, when a proximity communication system is constituted by such apparatuses as a computer and a home-electronic information apparatus, the communication is performed on a one-to-one basis. Also, one apparatus can communicate with a non-apparatus counterpart device (which will be referred to as a "card"), such as a contactless IC card. In such a case, an application for performing one-to-many communication between one apparatus and multiple cards is also possible.

While IC cards are rapidly coming to widespread use, there is also a problem in that multiple interface standards coexist. For example, although international standardization for proximity contactless IC cards have been promoted based on ISO/IEC 14443, there are still two types of specifications: type A and type B. Accordingly, in order to detect which type of card enters the operation space, the reader periodically and alternately transmits respective request commands (e.g., refer to "RFID Handbook—Principle and Application of Contactless IC Card" by Ryoji Iga et al., pp 175-187 (Kabushiki-gaisha Software Kogaku Kenkyusho). Other than those standards, card venders that manufacture and sell IC cards and card reading devices provide various interface standards for their IC cards. Further, the current situation is that command classes are different from each other, even when interface standards are the same.

The biggest problem in the contactless IC card technology is that different standards preclude compatibility and thus compatibility cannot be achieved in many cases even if standards are the same. The reason is that, while specifications up to a certain portion are specified for each standard, other specifications are independently formulated, thus making it impossible to achieve compatibility in the following points.

(1) Difference in Upper Layer Protocol
(2) Difference in Command Class
(3) Difference in Command Execution Procedure
(4) Difference in Security Algorithm
(5) Difference in Data Structure in Memory Space on Card Examples of the security algorithms include a mutual authentication scheme, an encryption scheme during data communication, checksum and MAC (message authentication code) generation methods. However, since those algorithms have security problems, the card venders do not make the specifications public.

With regard to minimum specifications including physical and electrical specifications, ISO/IEC 14443 specifies procedures performed when a card reading device detects an IC card, such as initialization, collision avoidance, and card determination for each type, but does not have stringent rules with regard to procedures after card determination. Therefore, the current situation is that a card-reading command and other commands after card determination vary among card venders and thus compatibility is not maintained even the commands are within the same interface standard.

In order to overcome such a difference between standards of the card venders, for example, an approach in which a process (firmware) corresponding to a card type is burned on an IC chip of a single card reading device is employed. For example, in an example shown in FIG. 10, a process firmware corresponding to a card specification supplied by company A and a process firm ware corresponding to a card specification supplied by company B are burned on an IC-chip ROM (read only memory) in a card reading device, so that a corresponding firmware is selectively executed in accordance with a card detected via an antenna so as to achieve compatibility with the respective cards of the venders.

According to the example shown in FIG. 10, a single card reading device can perform processing for contactless IC cards of different card venders. However, in order to achieve compatibility with a new type of card, work for re-burning a firmware in the IC chip arises. This requires development cost and maintenance cost for the replacement work. Also, this approach cannot be used for all cases, since some card venders do not disclose their security algorithms related to card processing.

Other methods for overcoming such a difference between standards of the card venders involve a method in which a card-dependent process is stored in chip-module hardware, instead of burning a process on the IC chip, and the hardware is inserted in a slot of the card reading device. For example, in an example shown in FIG. 11, a card reading device is provided with a plurality of chip module slots for replaceably inserting chip modules for card processing. Thus, when a chip module for a process corresponding to a card specification supplied by company A and a chip module for a process corresponding to a card specification supplied by company B are inserted into the respective slots, a corresponding process firmware is selectively executed in accordance with a card detected via an antenna so as to achieve compatibility with the respective cards of the venders: company A and company B. Further, when it is desired to achieve compatibility with cards of another vender, the chip module can be removed and replaced.

According to the example shown in FIG. 11, a single card reading device can perform processing for contactless IC cards of different card venders. However, since this scheme restricts the number of chip modules that can be inserted into a reading device, card types that can be handled by one reading device are limited. Also, when card processing is changed or a card type is changed, work such as developing a new chip module and disassembling the card reading device to physically replace chip modules arises.

Thus, all of the methods described above achieve processing in which one reading device can perform processes multiple types of cards, but do not make it easier to achieve compatibility with cards other than predetermined card types.

Nowadays, requirements for constructing an open system that is not vulnerable to a difference for each vender are increasing, mainly, in AFC (automatic fare collection) systems of public transport facilities. This is because known AFC systems need to dependent on specific card venders and card-reading-device venders, thus making it difficult to construct a low-cost and highly-flexible AFC system. A further reason is that various types of cards and reading devices appear on the market in conjunction with the widespread use of contactless IC cards in recent years, thus making it realistic to construct a highly-versatile AFC system.

DISCLOSURE OF INVENTION

An object of the present invention is to provide a superior contactless IC card communication system and a communication method in which a card reading device can preferably perform communication processing with contactless IC cards by using a predetermined command class and a security algorithm through a predetermined card-detection procedure.

A further object of the present invention is to provide a superior contactless IC card communication system and a communication method which allow communication processing so as to correspond to multiple types of contactless IC cards having different specifications, such as command classes and security algorithms.

The present invention has been made to overcome the foregoing problems and provides a contactless-IC-card communication system that is compatible with multiple contactless-IC-card specifications including command classes different from each other.

The contactless-IC-card communication system includes a controller module unit for processing card-dependent commands that differ depending on the contactless-IC-card specifications; and a through reader unit for encapsulating a card-dependent command received from a contactless IC card into a through command and delegating a process to the controller module unit, and for retrieving a card-dependent command from a through command received from the controller module and transmitting a resulting command to the contactless IC card.

The "system" used herein refers to a combination in which multiple devices (or function modules for accomplishing specific functions) gather logically and does not particularly restrict whether or not the devices and function modules are provided in a single housing. Also, the "contact-IC-card specifications" used herein include, at least, initialization and collision-protection procedures, application-level commands, and application-level protocols, and security requirements which are defined on "interface standards (or, interface specifications)" that define electrical properties and data-link-level protocols.

According to the contactless-IC-card communication system of the present invention, the through reader unit can execute a card determination procedure that is common to contactless-IC-card interface standards including card detection, collision avoidance, and card determination.

Thus, without performing a process for a command or response result communicated between an IC card and the card reading device, the through reader unit, which serves as a card reading device, encapsulates the command or result into a command that is called a through command and that is independent of the type of IC card and delegates the process to a controller module. This makes it possible to provide a card reading device that is independent of the type of IC card.

The controller module unit selectively executes multiple software modules containing command classes corresponding to the respective contactless-IC-card specifications, processes a card-dependent command from the contactless IC card, and generates a card-dependent command for the contactless IC card. The software modules are modularized for the respective contactless-IC-card specifications, in units of programs in which command groups and security algorithms corresponding to the respective contactless-IC-card specifications as well as communication-process procedures are written.

Further, the controller module further includes a common-process executing software module for executing a process that is independent of a difference between the contactless-IC-card specifications.

The software modules are downloaded to the controller module unit from an external server or the like, for example, during the installation or maintenance of the system.

According to the contactless-IC-card communication system of the present invention, a command and a process procedure which depended on the type of IC card are taken care of by a replaceable software module that is provided in the controller module and that corresponds to the card. Merely replacing the software module can make it easier to achieve compatibility with a new type of IC card and to make a change to process content for a currently-available IC card.

Preferably, the controller module unit provides an application firewall function for preventing the software modules from interfering with each other and a secure execution environment for preventing the software modules from improperly accessing resources of the controller module.

The controller module unit can be configured so that it is shared by multiple card reading devices and is delegated by respective through reader units so as to perform a process for the card-dependent command.

In this case, upon obtaining a response signal from a card present in the contactless communication area, each through reader unit encapsulates the received card-dependent command into a through command and delegates the process to the integrated controller module unit. In the controller module unit, the software module corresponding to the captured card is started to generate a card-dependent command, encapsulate the generated command into a through command, and return the resulting command to the through reader unit that requested the processing. The through reader unit then retrieves the card-dependent command from the through command and transmits the resulting command to the card without change.

With this configuration, the controller module functions can be centrally managed and work for downloading necessary software modules can be completed by a single operation. This makes it possible to achieve cost reduction and maintenance simplification and to achieve system expansion with relative ease.

The present invention can eliminate a need for constructing a system based on the card of a specific vender and the reading device of a specific vender. Thus, transportation operators and so on who construct contactless-IC-card systems can easily procure system components and can design flexible systems that are independent of venders.

According to the present invention, in situations in which card-process content is changed or a new type of card is employed, compatibility with new card specifications can be achieved by externally replacing software without physically removing or disassembling a reading device, thereby making it possible to reduce maintenance cost.

According to the present invention, since information that is not disclosed by card venders, such as processes and security algorithms which are specific to card types, is concealed in the software modules, confidential information for each card vender is protected.

Further objects, features, and advantages of the present invention will become apparent from more detailed description based on an embodiment described below according to the present invention and the accompanying drawings.

BRIEF DESCRIPTION OF THE DRAWINGS

FIG. 5 is a diagram showing an example in which the contactless-IC-card reading system of the present invention is applied to an automatic fare collection device (fare collection device) for a train or the like.

BEST MODE FOR CARRYING OUT THE INVENTION

An embodiment of the present invention will be described below in detail with reference to the drawings.

The present invention relates to a scheme in which a single reading system processes multiple contactless IC cards having different standards, such as command classes, for respective venders.

Figure 1:
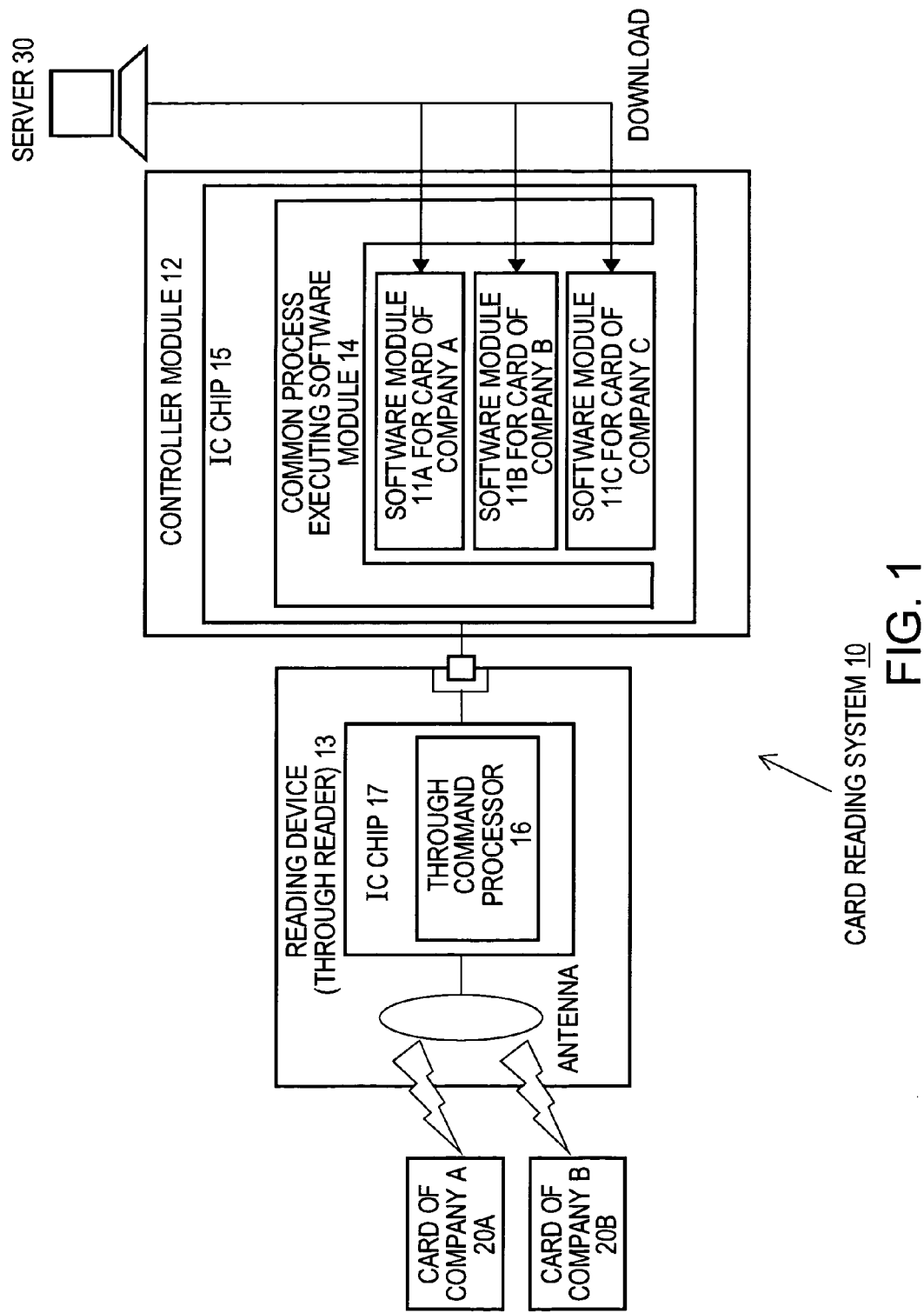
FIG. 1 is a diagram schematically showing the configuration of a contactless-IC-card-type card reading system 10 according to one embodiment of the present invention.

FIG. 1 schematically shows the configuration of a contactless-IC-card-type card reading system 10 according to one embodiment of the present invention. The card reading system 10 shown in the figure includes, mainly, a single or multiple software modules 11A, 11B, . . . prepared for respective card types, a controller module 12 for executing the software modules 11, a through reader 13 for communicating with contactless IC cards 20A, 20B, . . . at a physical/electrical low-layer protocol level.

The software modules 11 are provided (modularized) for respective types of cards, in units of programs in which command groups and security algorithms corresponding to respective contactless-IC-card specifications as well as communication-process procedures are written. A software module that is called a common-process executing software module 14 and that performs a process independent of a card type is also provided.

In the present embodiment, the common-process executing software module 14 determines the type of detected card, performs processing for sorting a process to the software module 11 for the corresponding card, and performs a through-command process (described below). The process that is independent of a card type, as used herein, includes, for example, calling an AES (Advanced Encryption Standard) or DES (Date Encryption Standard) engine for performing encryption processing according to an encryption parameter received from the software module 11.

The software modules 11 for the respective cards of companies and the common-process executing software module 14 are downloaded from an external server 30 to the controller module 12 during the installation or maintenance of the system. In order to prevent the software modules from being analyzed or tampered with through tapping by a third party, the software modules 11 are downloaded using a secure scheme with an anti-tamper IC chip 15 and are stored in the IC chip 15.

The controller module 12 executes the common-process executing software module 14 and the software modules 11 corresponding to respective card specifications of companies, the modules being stored in the IC chip. In the present embodiment, the controller module 12 provides an application firewall function for preventing the software modules 11 from interfering with each other and a secure execution environment for preventing the software modules 11 from improperly accessing resources of the controller module 12.

The through reader 13 communicates with the contactless IC cards 20A, 20B, . . . at a physical/electrical low-layer protocol level for card initialization, collision avoidance, card determination, and so on during card detection. That is, the through reader 13 communicates with each card, and without performing a process corresponding to a response result from the card, delegates the process to the controller module 12.

Figure 2:
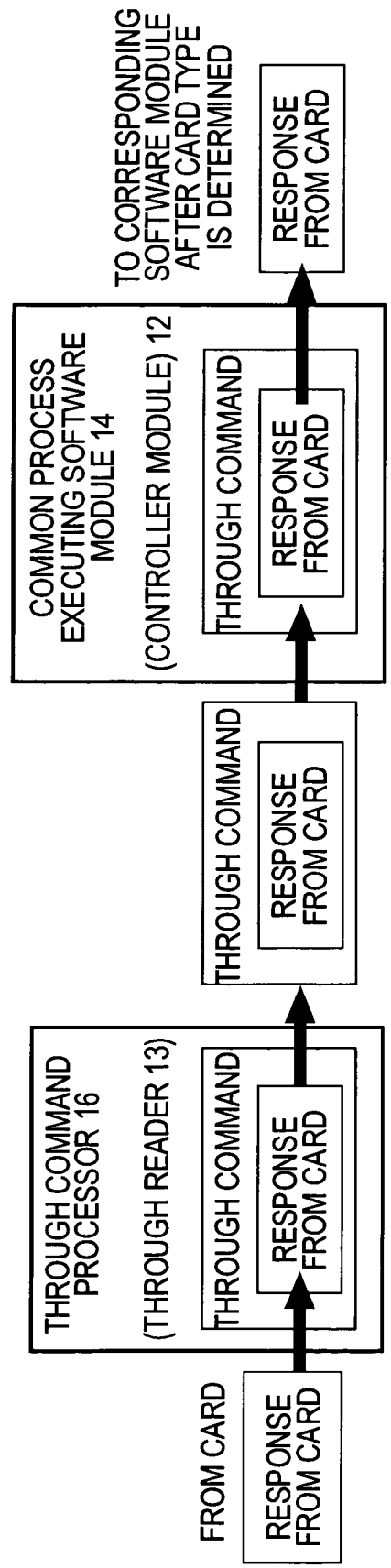
FIG. 2 is a diagram illustrating the operation of the card reading system 10 when a response from a card is read.

FIG. 2 shows the operation of the card reading system 10 when a response from a card is read. Upon receiving a response from a card, a through-command processor 16 in the through reader 13 transmits a response result, encapsulated in a command that is referred to as a "through command" and that is independent of a card type, to the controller module 12. The through-command process is implemented on an anti-tamper IC chip 17 to protect unauthorized uses, such as tapping and tampering of a card-dependent command.

In the controller module 12, the corresponding software module is executed to process a card-dependent command contained in a through command. Specifically, the common-process executing software module 14 determines a card type and sorts a process to the software module 11 for the corresponding card. Then, the corresponding software module 11 is started, so that a command process procedure and a communication process procedure corresponding to the card type are executed.

Figure 3:
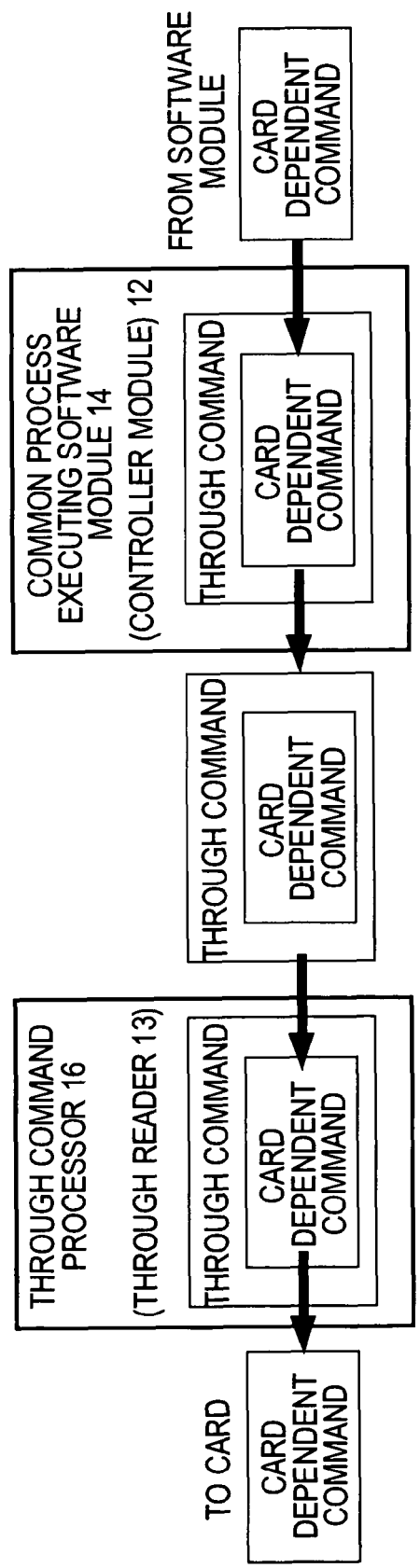
FIG. 3 is a diagram illustrating the operation of the card reading system 10 when a command is issued to the card.

FIG. 3 shows the operation of the card reading system 10 when a command is issued to a card. The software modules 11 have a group of commands corresponding to card types and can generate card-dependent commands. When transmitting a command to a card, the controller module 12 encapsulates a card-dependent command into a through command and transmits the resulting command to the through reader 13. The through-command processor 16 in the through reader 13 retrieves the card-dependent command from the through command and transmits the resulting command without change. The through-command process is implemented on the anti-tamper IC chip 17 to protect unauthorized uses, such as tapping and tampering of the card-dependent command (as described above).

Figure 4:
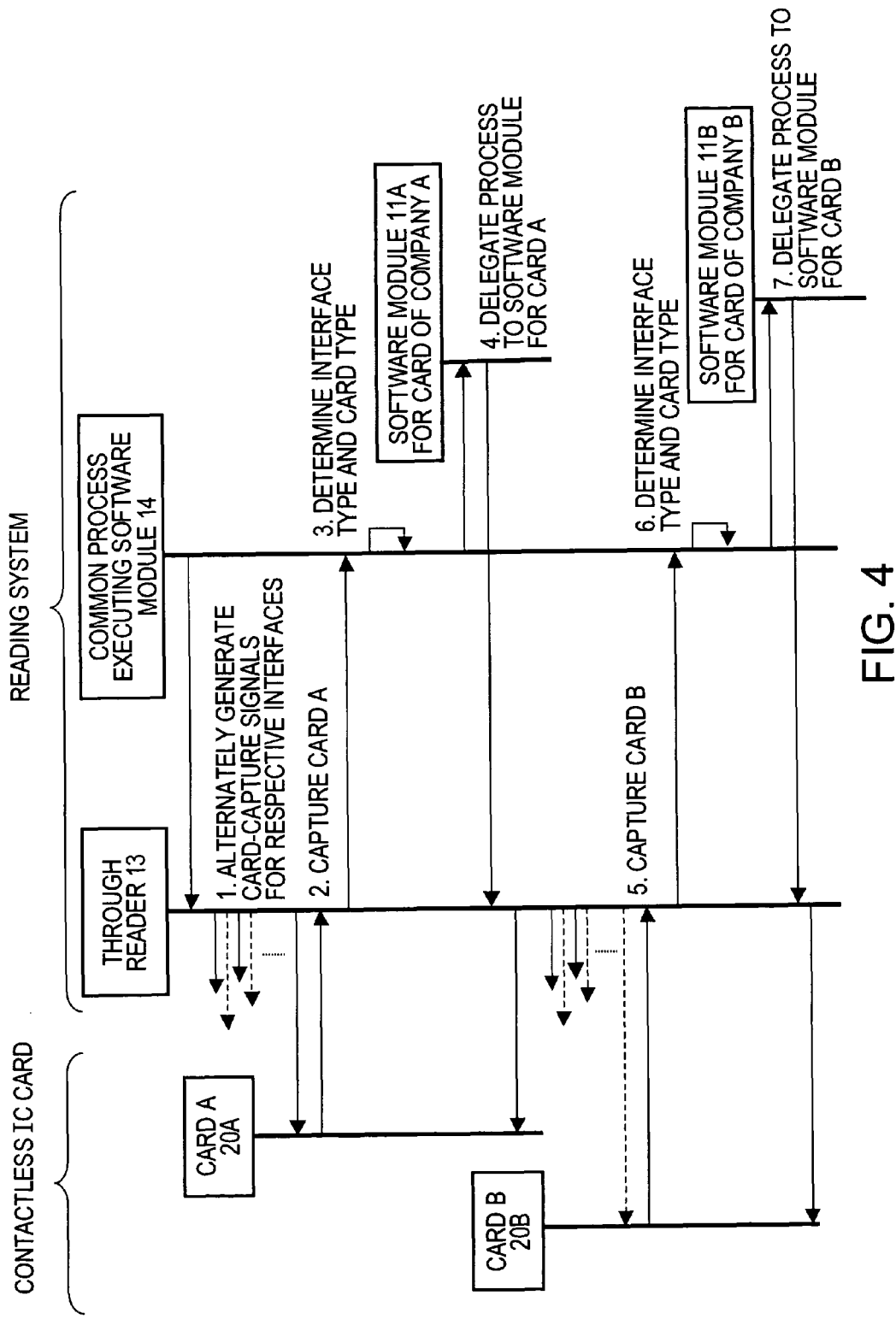
FIG. 4 is a diagram showing an example of an operation sequence for the card reading system 10 to perform data communication with contactless IC cards.

FIG. 4 shows an example of an operation sequence for the card reading system 10 of the present embodiment to perform data communication with a contactless IC card.

The common-process executing software module 14 issues a card-capture instruction to the through reader 13. In response to the instruction, the through reader 13 alternately generates card-capture signals that differ depending on card standards.

Upon receiving a response signal from card A that is present in the contactless communication area of the through reader 13, the through-command processor 16 in the through reader 13 encapsulates the received response command into a through command and transmits the resulting command to the common-process executing software 14.

The common-process executing software module 14 determines a card type, sorts a process to the software module 11A for corresponding card A, and delegates a command process.

The software module 11A for card A has a command process corresponding to card A, a security algorithm, and a communication process procedure. When the software module 11A generates a card-dependent command, the common-process executing software module 14 encapsulates the command into a through command and transmits the resulting command to the through reader 13. The through-command processor 16 in the through reader 13 retrieves the card-dependent command from the through command and transmits the resulting command without change.

Also, upon receiving a response signal form card B that is present in the contactless communication area of the through reader 13, the through-command processor 16 in the through reader 13 encapsulates the received response command into a through command and transmits the resulting command to the common-process executing software module 14.

The common-process executing software module 14 determines a card type, sorts a process to the software module 11B for corresponding card B, and delegates a command process.

The software module 11B for card B has a command process corresponding to card B, a security algorithm, and a communication process procedure. When the software module 11B generates a card-dependent command, the common-process executing software module 14 encapsulates the command into a through command and transmits the resulting command to the through reader 13. The through-command processor 16 in the through reader 13 retrieves the card-dependent command from the through command and transmits the resulting command without change.

Figure 5:
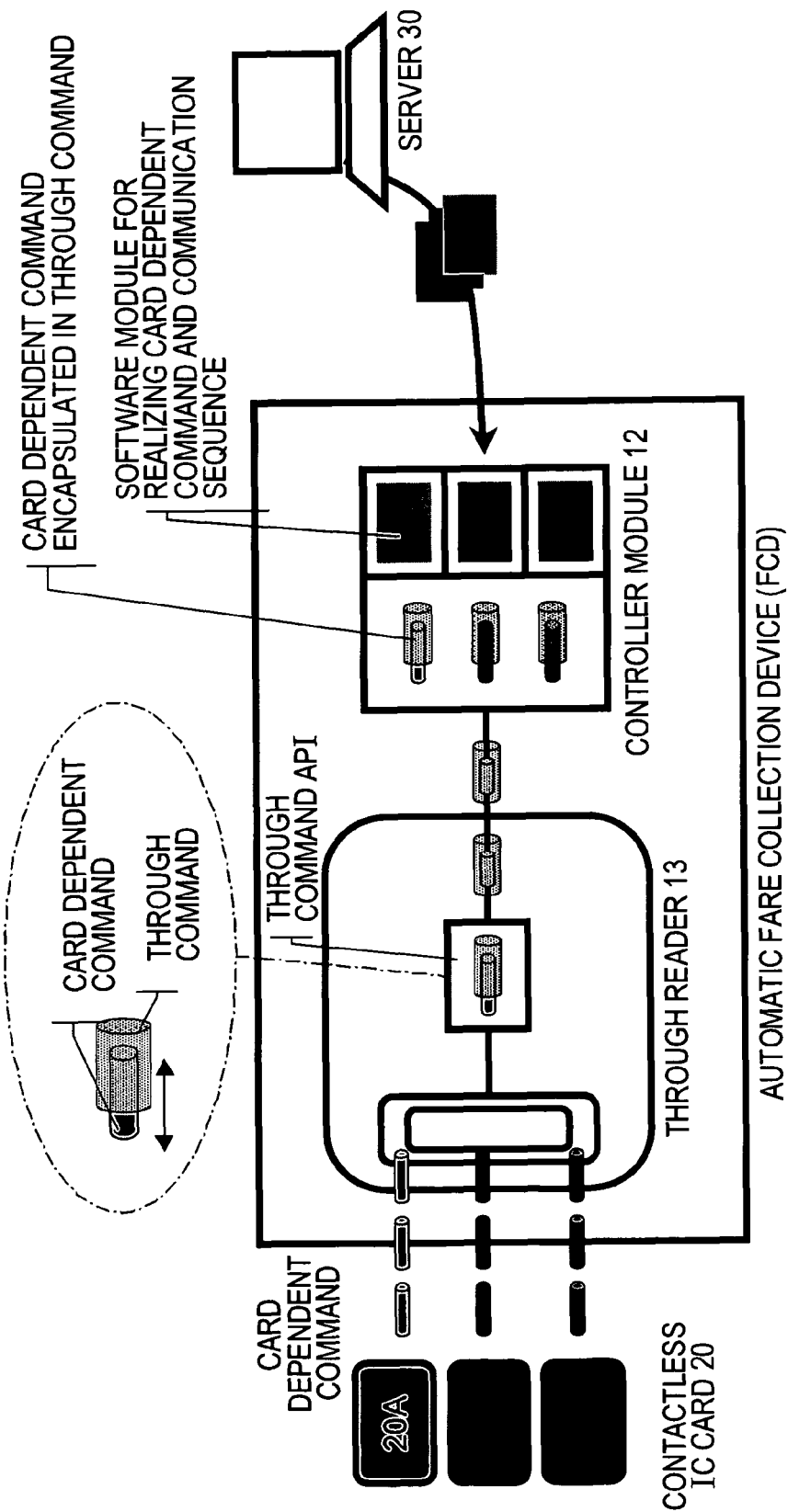

FIG. 5 shows an example in which the contactless-IC-card reading system of the present invention is applied to an automatic fare collection device (fare collection device).

In the example shown in the figure, the automatic fare collection device includes a through reader 13 and a controller module 12 and can read cards corresponding to interface specifications that differ depending on card venders: company A, company B, and company C.

The controller module 12 provides an application firewall function for preventing the software modules 11 from interfering with each other and a secure execution environment for preventing the software modules 11 from improperly accessing resources of the controller module 12.

In order to be compatible with contactless IC card specifications of company A, company B, and company C, the automatic fare collection device pre-downloads the software modules 11A, 11B, and 11C, which process the cards of the respective companies, from the external server 30. In order to prevent the software modules from being analyzed or tampered with through tapping by a third person during the download process, the software modules 11 are downloaded using a secure scheme with an anti-tamper IC chip 15 and are stored in the IC chip 15.

The through reader 13 communicates with the contactless IC cards 20A, 20B, . . . at a physical/electrical low-layer protocol level for card initialization, collision avoidance, card determination, and so on during card detection. That is, the through reader 13 communicates with each card, and without performing a process corresponding to a response result from the card, delegates the process to the controller module 12.

In response to a card-capture instruction from the controller module 12, the through reader 13 alternately generates card-capture signals that differ depending on the card standards of the companies.

When a response signal is obtained from a card that is present in the contactless communication area of the through reader 13, the through-command processor 16 in the through reader 13 encapsulates a card-dependent response command (proprietary command) into a through command (through-command) and transmits the resulting command to the controller module 12 without change to thereby delegate a command process.

In the controller module 12, the software module corresponding to the captured card is started to generate a card-dependent command, encapsulate the generated command into a through command, and pass the resulting command to the through reader 13. The through-command processor 16 in the through reader 13 retrieves the card-dependent command from the through command and transmits the resulting command to the contactless IC card without change.

In the through reader 13, the process for encapsulating the card-dependent command into the through command and the process for retrieving the card-dependent command from the through command and transmitting the resulting command are executed by a through command API (application programming interface). The through command API itself does not process the card-dependent command and thus can be used for all card interface specifications.

Figure 6:
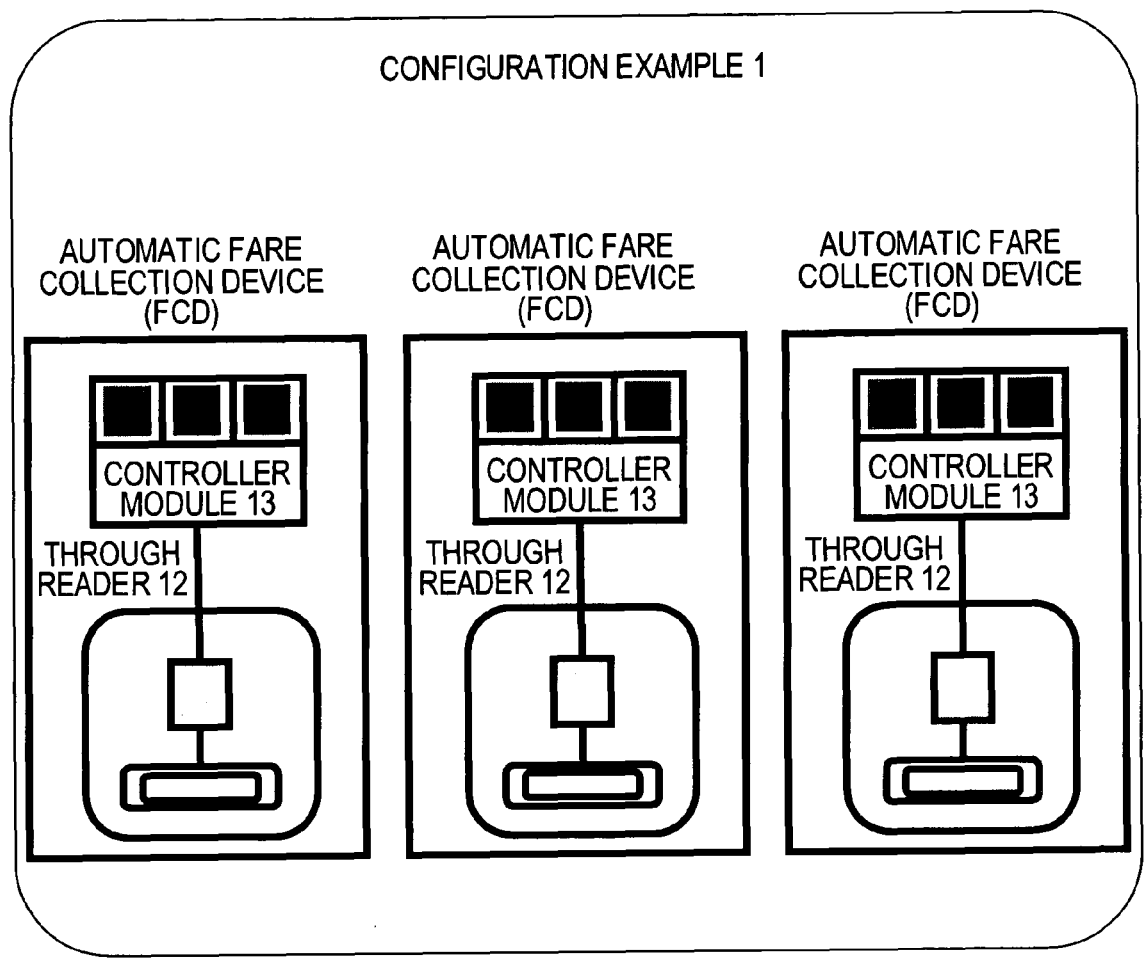
FIG. 6 is a diagram showing an example of the configuration of an automatic fare collection system.
Figure 7:
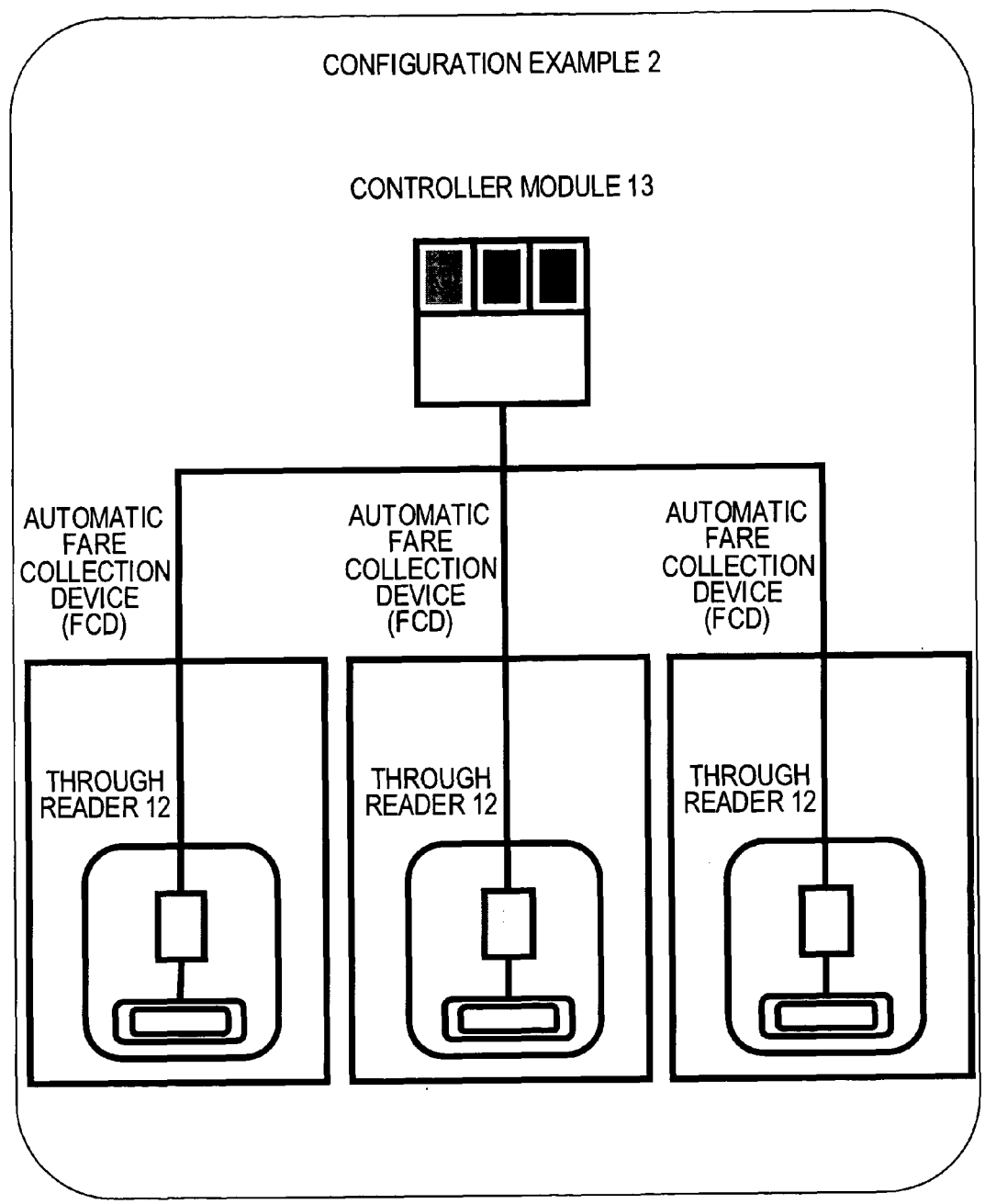
FIG. 7 is a diagram showing another example of the configuration of the automatic fare collection system.

FIGS. 6 and 7 show examples of the configuration of an automatic fare collection system installed, for example, in station premises. Multiple automatic fare collection devices are installed at, for example, respective ticket gates in station premises.

In the example shown in FIG. 6, respective automatic fare collection devices are equipped with independent controller modules 13 and necessary software modules are downloaded to the respective controller module 13.

On the other hand, in the example shown in FIG. 7, multiple fare collection devices share one through reader 13. Each fare collection device includes only the through reader 13. Upon obtaining a response signal from a card present in the contactless communication area, each through reader 13 encapsulates the received card-dependent command into a through command and delegates the process to the integrated controller module 12. In the controller module 12, the software module corresponding to the captured card is started to generate a card-dependent command, encapsulate the generated command into a through command, and return the resulting command to the through reader 13 that requested the processing. The through reader 13 then retrieves the card-dependent command from the through command and transmits the resulting command to the contactless IC card without change.

In the example shown in FIG. 7, the controller module functions can be centrally managed and work for downloading necessary software modules can be completed by a single operation. This makes it possible to achieve cost reduction and maintenance simplification and to achieve system expansion with relative ease.

Figure 8:
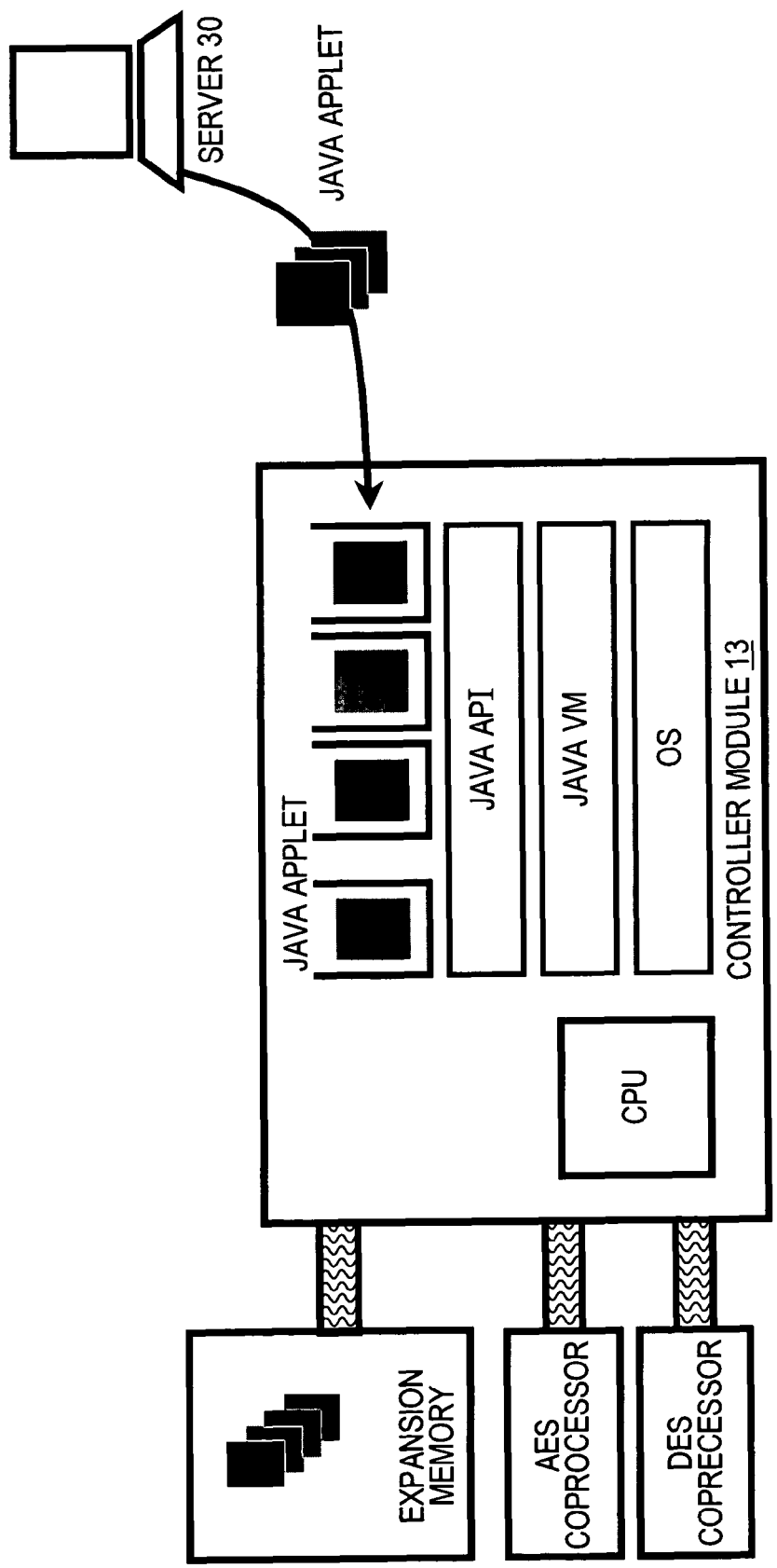
FIG. 8 is a diagram showing the functional configuration of a controller module 12.
Figure 9:
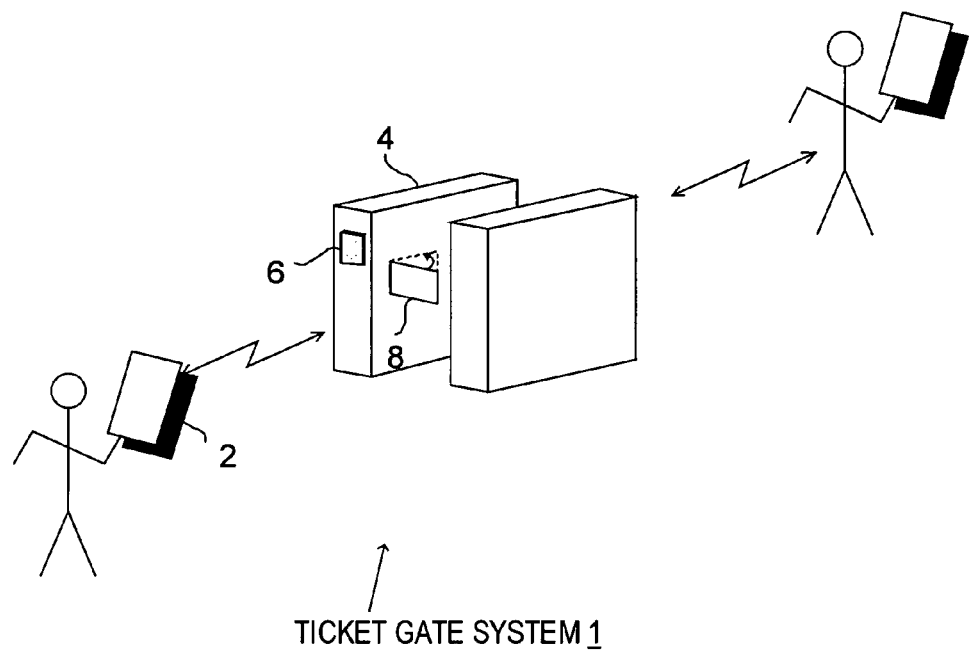
FIG. 9 is a diagram schematically showing the configuration of a ticket-gate system that is implemented using contactless communication.
Figure 10:
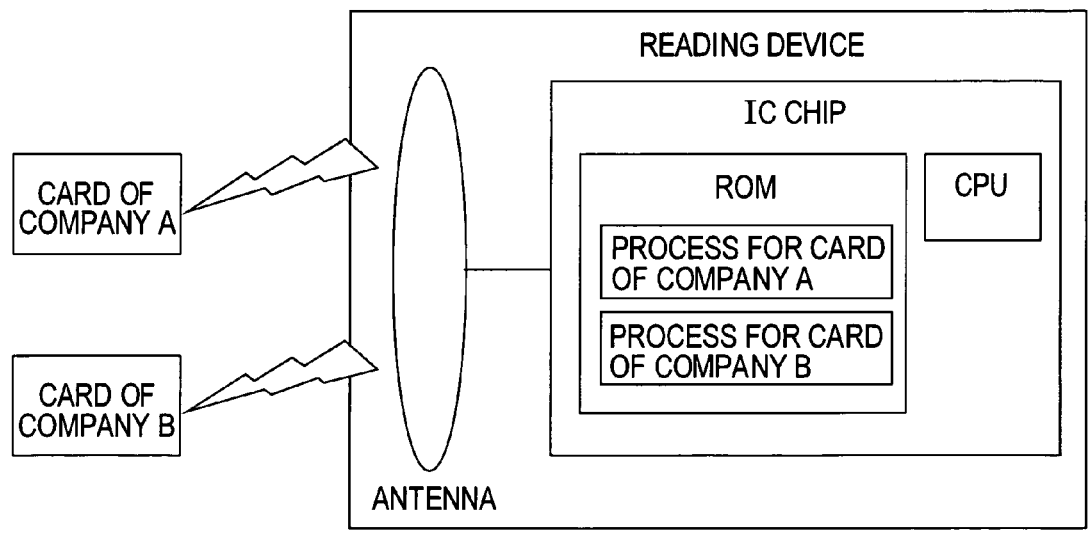
FIG. 10 is a diagram illustrating a known method in which processes corresponding to card types are burned on an IC chip of a single card reading device to allow the single card reading device to perform processing for contactless IC cards of different card venders.
Figure 11:
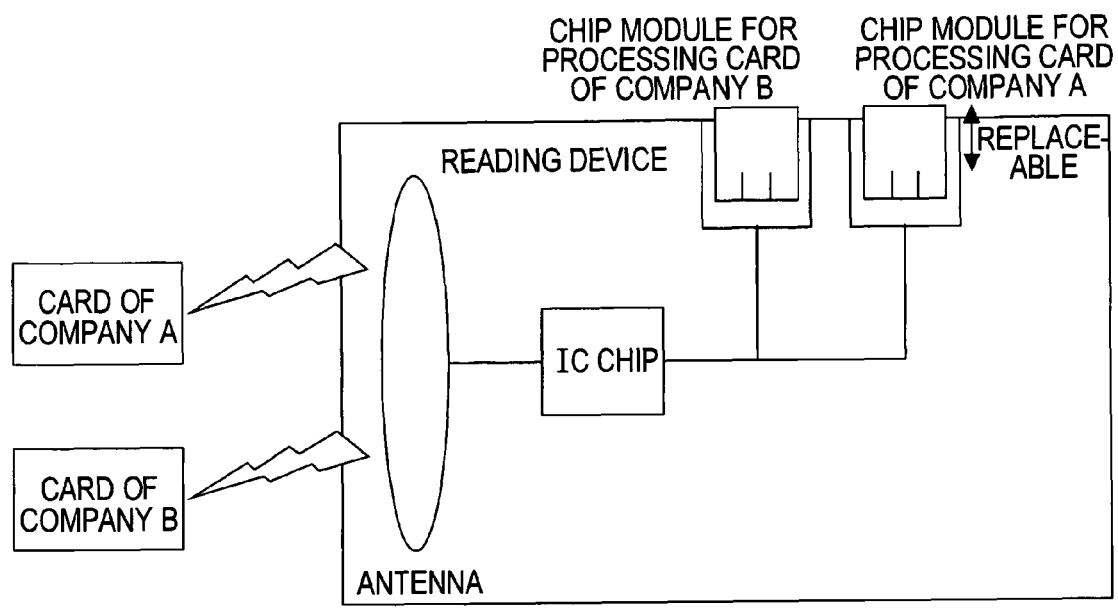
FIG. 11 is a diagram illustrating a known method in which card-dependent processes are stored in chip-module hardware and the chip modules are inserted into slots of a card reading device to allow the single card reading device to perform processing for contactless IC cards of different card venders.

FIG. 8 shows the functional configuration of the controller module 12.

The controller module 12 is implemented with a platform having a combination of an operating system (OS), a Java virtual machine (Java VM), and a Java API. The platform is not limited to such a configuration to achieve the present invention, but it is preferable that the platform be open and be based on a typical execution environment to allow various card vendors to freely develop an application.

The Java VM is a virtual computer that interprets and executes a program written in Java language, and executes a Java program that is converted into byte code by a Java compiler. The Java API is grouped (packaged) as a library of relevant classes and interfaces. The Java API and Java VM isolate a program and hardware.

The controller module 12 stores the software modules 11 for cards supplied by card venders. Each software module 11 is a module incorporating all communication process procedures, such as a command class and a security algorithm corresponding to the specification of each card vender and is written in Java applet.

Java applet is a small application written in Java language and can be distributed using a WWW (World Wide Web) technology. That is, Java applets are compiled in advance, are registered with a WWW server, and are specified with a tag "<applet>" in an HTML (hyper text markup language) document.

The controller module 12 downloads a necessary card-processing software module from the external server 30. In the process of downloading the software module, confidentiality needs to be ensured.

The platform of the controller module 12 provides an application firewall function for preventing the software modules 11 from interfering with each other and a secure execution environment for preventing the software modules 11 from improperly accessing resources of the controller module 12. The Java platform prepares an off-the-shelf (i.e., ready-made) security mechanism.

In order to prevent the software modules 11 from being analyzed and tampered with through tapping by a third party, the software modules 11 are implemented on an anti-tamper IC chip.

The controller module 12 is provided with an encryption coprocessor for DES (data encryption standard), AES (advance encryption standard), and so on and thus can achieve higher-speed encryption/decryption processing.

The controller module 12 is also provided with an extension memory for caching (temporarily storing) a software component and so on.

Buses that interconnect the encryption coprocessor, the extension memory, and the controller module 12 have a scrambling mechanism for preventing tapping.

Supplement

The present invention has been described above in detail with reference to the particular embodiment. However, it is obvious that those skilled in the art can make a modification and substitution to the embodiment in a scope without departing from the substance of the present invention. That is, the present invention has been disclosed by way of example and what is described herein should not be construed as limiting. The substance of the invention is to be determined by taking the claims into account.

INDUSTRIAL APPLICABILITY

The present invention can provide a superior contactless-IC-card communication system and a communication method in which a card reading device can preferably perform communication processing with a contactless IC card by using a predetermined command class and a security algorithm through a predetermined card-detection procedure.

The present invention can further provide a superior contactless-IC-card communication system and a communication method which allow communication processing so as to correspond to multiple types of contactless IC cards having different specifications, such as command classes and security algorithms.

The present invention can eliminate a need for constructing a system based on a reading device of a specific vender and a card of a specific vender that provides more than one type of contactless IC card satisfying a specific contactless-IC-card specification. Thus, transportation operators and so on who construct contactless-IC-card systems can easily procure system components and can design flexible systems that are independent of contactless-IC-card specifications.

According to the present invention, in situations in which card-process content is changed or a new type of card is employed, compatibility with a new card interface specification can be achieved by externally replacing software without physically removing or disassembling a reading device, thereby making it possible to reduce maintenance cost.

According to the present invention, since information that is not disclosed by card venders, such as processes and security algorithms which are specific to card types, is concealed in the software modules, confidential information for each card vender is protected.

The invention claimed is:

1. A contactless-IC-card communication system that is compatible with multiple contactless-IC-card specifications including command classes different from each other, the communication system comprising:
a through reader unit configured to communicate with multiple contactless IC cards, each having one of a plurality of different IC-card specifications, and to receive a response from a contactless IC card that is dependent upon the contactless IC card's IC-card specification, wherein the through reader unit encapsulates the response and transmits the encapsulated response without performing a process corresponding to the IC card specification of the IC card by delegating the process corresponding to the IC card specification of the IC card to a controller module unit; and
the controller module unit configured to receive the encapsulated card-dependent response from the through reader unit, to selectively execute multiple software modules containing command classes corresponding to the contactless-IC-card specification corresponding to the IC card specification of the contactless IC card, to process the response of the at least one of the multiple contactless IC cards, and to generate a command dependent upon the IC card specification of the contactless IC card, wherein the controller module unit provides an application firewall function for preventing the software modules from interfering with each other and a secure execution environment for preventing the software modules from improperly accessing resources of the controller module unit,
wherein the through reader unit is further configured to receive the command from the controller module unit, said through reader unit including an anti-tamper IC chip to prevent unauthorized use of the command, and to transmit the command to the contactless IC card.

2. The contactless-IC-card communication system according to claim 1, wherein the through reader unit is configured to execute a card determination procedure that is common to contactless-IC-card interface standards including card detection, collision avoidance, and card determination.

3. The contactless-IC-card communication system according to claim 1, wherein the controller module unit further comprises a common-process executing software module configured to execute a process that is independent of a difference between the command classes of the contactless-IC-card specifications.

4. The contactless-IC-card communication system according to claim 1, wherein the software modules are modularized for the respective contactless-IC-card specifications, in units of programs in which command groups and security algorithms corresponding to the respective contactless-IC-card specifications as well as communication-process procedures are written.

5. The contactless-IC-card communication system according to claim 1, further comprising:
a download processing unit configured to download the software modules from an external server to the controller module unit.

6. The contactless-IC-card communication system according to claim 1, wherein the controller module unit is communicatively coupled to multiple through reader units so as to perform a process for card-dependent responses received by the controller module unit from the multiple through reader units.

7. A contactless-IC-card communication method, executed by a IC-card reading apparatus, that is compatible with multiple contactless-IC-card specifications including command classes different from each other, the communication method comprising:
receiving, at a through reader unit of the IC-card reading apparatus, a response from a contactless IC card that is dependent upon the contactless IC card's IC-card specification;
encapsulating, with an anti-tamper IC chip in the IC-card reading apparatus to prevent unauthorized use of the card-dependent response, the response and transmitting, at the through reader unit, the encapsulated response without the through reader unit performing a process corresponding to the IC card specification by delegating the process corresponding to the IC card specification to a controller module unit;
receiving, at the controller module unit, the encapsulated response; and
performing, at the controller module, a card-dependent process in accordance with the IC card specification, the performing the card-dependent process including selectively executing multiple software modules containing command classes corresponding to the IC card specification, processing the response of the contactless IC card, and generating a command dependent upon the IC card specification of the contactless IC card, wherein the performing includes the controller module unit providing an application firewall function for preventing the software modules from interfering with each other and a secure execution environment for preventing the software modules from improperly accessing resources of the controller module unit.

8. The contactless-IC-card communication method according to claim 7, further comprising:
generating, at the controller module unit, the command in accordance with the contactless IC card and encapsulating the command into a non-card-dependent through command; and
receiving, at the through reader unit, the command from the non-card-dependent through command and transmitting a resulting command to the contactless IC card.

9. The contactless-IC-card communication method according to claim 7, further comprising:
executing a card determination procedure that is common to contactless-IC-card interface standards including card detection, collision avoidance, and card determination.

10. The contactless-IC-card communication method according to claim 7, wherein the performing the card-dependent process comprises executing a common process that is independent of a difference between the contactless-IC-card specifications.

11. The contactless-IC-card communication method according to claim 7, wherein the software modules are modularized for the respective contactless-IC-card specifications, in units of programs in which command groups and security algorithms corresponding to the respective contactless-IC-card specifications as well as communication-process procedures are written.

12. The contactless-IC-card communication method according to claim 7, further comprising:
downloading the software modules from an external server.

13. The contactless-IC-card communication system according to claim 1, wherein the controller module unit is configured to perform encryption processing using an AES (Advanced Encryption Standard) or DES (Date Encryption Standard) engine.

14. The contactless-IC-card communication system according to claim 1, wherein the through reader unit does not determine the IC-card specification of the contactless IC card, and the controller module unit determines the IC-card specification of the contactless IC card after receiving the encapsulated response from the through reader unit.

* * * * *